US007251496B2

(12) United States Patent
Thubert et al.

(10) Patent No.: US 7,251,496 B2
(45) Date of Patent: Jul. 31, 2007

(54) MOBILE DIRECTOR

(75) Inventors: Pascal Thubert, La Colle sur Loup (FR); Eric Levy-Abegnoli, Nice (FR); David C. Forster, Reading (GB); Kent K. Leung, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 369 days.

(21) Appl. No.: 10/265,563

(22) Filed: Oct. 3, 2002

(65) Prior Publication Data

US 2004/0092260 A1 May 13, 2004

(51) Int. Cl.
*H04B 7/00* (2006.01)
*H04L 12/28* (2006.01)
*H04L 12/56* (2006.01)

(52) U.S. Cl. .............. 455/517; 455/521; 370/392; 370/401

(58) Field of Classification Search ........... 455/516, 455/517, 432.1, 433, 435, 445, 435.1, 518, 455/519, 422.1; 370/392, 401, 354, 355, 370/331
See application file for complete search history.

(56) References Cited

U.S. PATENT DOCUMENTS

| 6,445,922 B1 * | 9/2002 | Hiller et al. ............ 455/433 |
| 6,567,664 B1 * | 5/2003 | Bergenwall et al. ........ 455/403 |
| 6,728,536 B1 * | 4/2004 | Basilier et al. .......... 455/432.1 |
| 6,816,912 B1 * | 11/2004 | Borella et al. ............ 709/238 |
| 6,834,300 B1 * | 12/2004 | Barna et al. ............. 709/223 |
| 6,836,477 B1 * | 12/2004 | West et al. ............... 370/352 |
| 6,856,624 B2 * | 2/2005 | Magret ..................... 370/392 |
| 2004/0137888 A1 * | 7/2004 | Ohki ....................... 455/417 |
| 2004/0203765 A1 * | 10/2004 | Das et al. ................ 455/435.1 |

FOREIGN PATENT DOCUMENTS

WO           99/31853         6/1999

(Continued)

OTHER PUBLICATIONS

Gustafsson, et al., Mobile IPv4 Regional Registration, *Mobile IP Working Group, Internet Draft*, Oct. 22, 2002, pp. 1-41.

(Continued)

*Primary Examiner*—Tilahun Gesesse
(74) *Attorney, Agent, or Firm*—Beyer Weaver LLP (57) ABSTRACT

Methods and apparatus for processing registration requests by a Home Agent supporting Mobile IP are disclosed. A registration request is received from each of a plurality of Mobile Nodes, the registration request specifying a care-of address. A binding is established between each of the plurality of Mobile Nodes and the associated care-of address, each of the plurality of Mobile Nodes being associated with one another. For instance, the plurality of Mobile Nodes may be statically or dynamically assigned the same Home Address. A tunnel is then created between the Home Agent and the care-of address for each of the plurality of Mobile Nodes, thereby enabling a server request to be distributed by the Home Agent to one of the plurality of Mobile Nodes via the associated tunnel. For instance, a server request addressed to the Home Address may be forwarded to one of the Mobile Nodes assigned that Home Address.

41 Claims, 7 Drawing Sheets

FOREIGN PATENT DOCUMENTS

| WO | 00/31942 | 6/2000 |
|----|----------|--------|
| WO | 02/071720 | 9/2002 |
| WO | WO 02/071720 A1 | 9/2002 |
| WO | WO 2004/032396 A2 | 4/2004 |

OTHER PUBLICATIONS

Perkins, C., RFC 3220: IP Mobility Support for IPv4, *IETF RFC*, Jan. 31, 2002, pp. 1-99.

Aboba B et al., "The Network Access Identifier", Network Working Group Request for Comments, Jan. 1999, pp. 1-5, XP002958183.

Heissehuber et al., "Home Agent Redundancy and Load Balancing in Mobile IPV6", Broadband Communications Proceedings of the International IFIP-IEEE Conference on Broadband Communications, Nov. 10, 1999, pp. 235-244.

International Search Report, Application No. PCT/US03/31499, Mailed Mar. 31, 2004; 4 pages.

Examiner's Communication pursuant to Article 96(2) EPC dated Sep. 12, 2006, from related European Patent Application No. 04 707 390.3.

\* cited by examiner

MOBILE DIRECTOR

BACKGROUND OF THE INVENTION

1. Field of the Invention

The present invention relates to Mobile IP network technology. More particularly, the present invention relates to distributing server requests among a cluster of servers that have registered as Mobile Nodes.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one node and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC 3220, "IP Mobility Support for IPv4" of the Network Working Group, C. Perkins, Ed., January 2002. Mobile IP is also described in the text "Mobile IP, The Internet Unplugged" by J. Solomon, Prentice Hall, 1998. Both of these references are incorporated herein by reference in their entireties and for all purposes.

Figure 1:
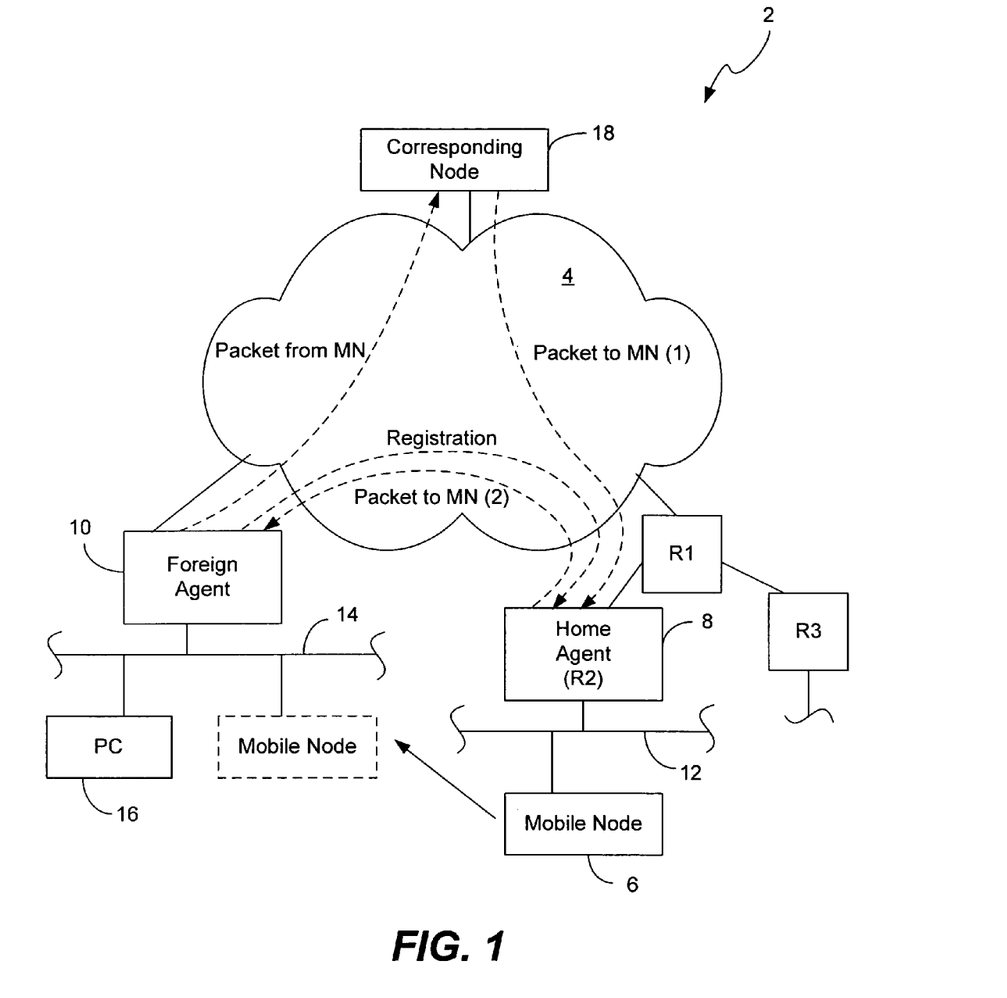
FIG. 1 is a block diagram of a Mobile IP environment.

The Mobile IP process and environment are illustrated in FIG. 1. A Mobile IP environment 100 includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R1 125. Router R1 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of the message from the correspondent node 155 are forwarded over the Internet 105 to the router R2 125 and ultimately to the home agent 115.

From the home agent's 115 mobility binding table, the home agent 115 recognizes that the mobile node 110 is no longer attached to the home network segment 135. The home agent 115 then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 strips the encapsulation and forwards the message to the mobile node 110 on the remote network segment 140. The packet forwarding mechanism implemented by the home agent 115 to the foreign agent 120 is often referred to as "tunneling."

Figure 2:
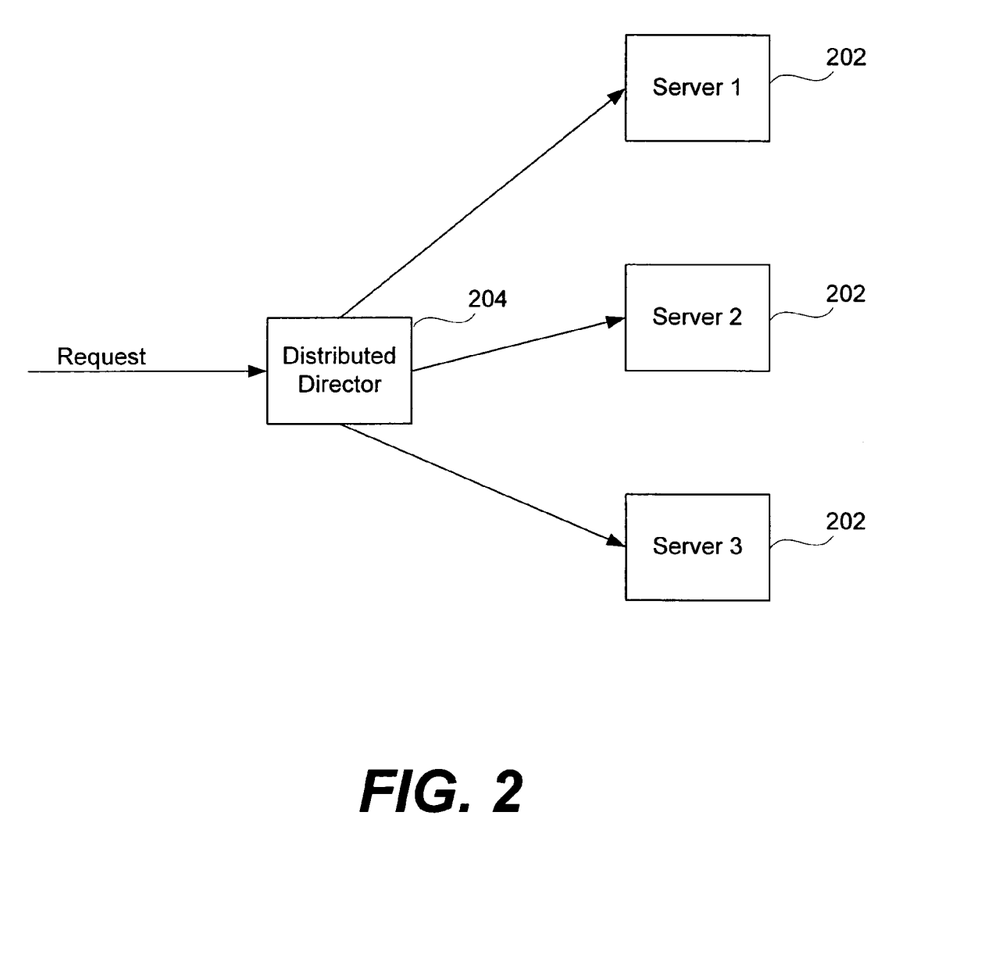
FIG. 2 is a diagram illustrating a prior art system for distributing server requests.

Various systems exist that are capable of distributing server requests to a server that is selected from a group of servers. FIG. 2 is a diagram illustrating a prior art system for distributing server requests. The server selection process is typically accomplished using various metrics such as distance and/or load. One such system is tile DistributedDirector, available as Cisco CSS11K content switch from Cisco Systems, Inc. In such a system, a cluster of servers 202 are each typically attached to the same Local Area Network (LAN) as the director 204 that is responsible for distributing server requests that it receives. However, such a prior art system typically requires that each server in the cluster of servers 202 be directly connected to the director 204 that dispatches server requests to the cluster of servers 202, as shown, in order for server requests to be efficiently routed. Unfortunately, such a system cannot distribute server requests to servers that are not directly connected to the director 204 responsible for dispatching those requests without significant limitations.

In view of the above, it would be desirable if a system could be developed that could enable server requests to be distributed to servers such as remotely located servers. Moreover, it would be beneficial if a system could be implemented to efficiently and effectively route server requests to servers in a Mobile IP environment.

SUMMARY OF THE INVENTION

The present invention provides methods and apparatus for dispatching server requests. This is accomplished, in part, through processing registration requests received from a set of Mobile Nodes acting as servers by a Home Agent supporting Mobile IP. Once the Mobile Nodes have registered with the Home Agent, server requests may be dispatched to any of the Mobile Nodes, thereby enabling a server request to be forwarded to a server capable of satisfying the request.

In accordance with one aspect of the invention, a Home Agent processes registration requests received from a cluster of Mobile Nodes capable of acting as servers in response to server requests. A registration request is received from each of a plurality of Mobile Nodes, the registration request specifying a care-of address. A binding is established between each of the plurality of Mobile Nodes and the associated care-of address, each of the plurality of Mobile Nodes being associated with one another. For instance, the plurality of Mobile Nodes may be statically or dynamically assigned the same Home Address. A tunnel is then created between the Home Agent and the care-of address for each of the plurality of Mobile Nodes, thereby enabling a server request to be distributed by the Home Agent to one of the plurality of Mobile Nodes via the associated tunnel. For instance, a server request addressed to the Home Address may be forwarded to one of the Mobile Nodes assigned that Home Address.

In accordance with another aspect of the invention, a server request dispatching system includes a network device supporting Mobile IP (e.g., Home Agent) adapted for establishing a binding between a plurality of Mobile Nodes and associated care-of address, the plurality of Mobile Nodes having the same Home Address. In addition, a request dispatching mechanism adapted for receiving a server request from a Correspondent Node and forwarding the server request to one of the plurality of Mobile Nodes, the server request being addressed to the Home Address associated with the plurality of Mobile Nodes. The request dispatching mechanism may be implemented by the Home Agent or a device coupled to the Home Agent.

In accordance with yet another aspect of the invention, a dispatcher is coupled to the network device and adapted for selecting one of the Mobile Nodes to service the server request. The dispatcher may select a Mobile Node (e.g., server) according to various metrics including, but not limited to, load and proximity to the Correspondent Node. The dispatcher may be combined with the network device (e.g., Home Agent) in a single device or in a network device separate from the Home Agent.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

Figure 3:
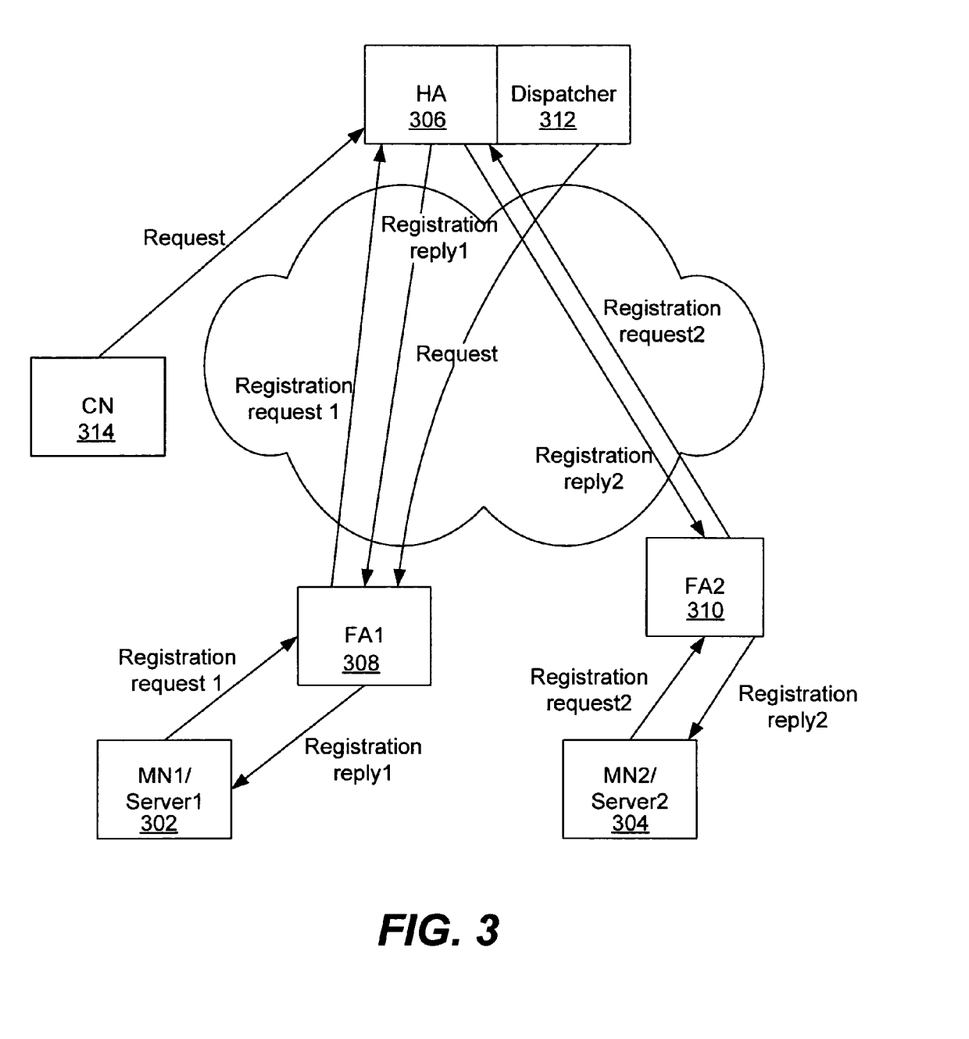
FIG. 3 is a diagram illustrating a server request dispatching system for dispatching a server request to one of a cluster of Mobile Nodes in accordance with various embodiments of the invention.

FIG. 3 is a diagram illustrating a server request dispatching system for dispatching a server request to one of a cluster of Mobile Nodes in accordance with various embodiments of the invention. The cluster of Mobile Nodes includes a plurality of Mobile Nodes that are associated with the cluster. More specifically, each of the Mobile Nodes functions as a server. For instance, the servers may support applications or functions identical to one another, and therefore the servers may provide the same functionality as the other servers. As one example, each of the servers may provide access to the same web site or web page. Alternatively, each of the servers may provide different functionality from one another.

In this example, two different Mobile Nodes, Mobile Node 1 (MN1) 302 and Mobile Node 2 (MN2) 304, register with Home Agent 306. As described above, the Mobile Nodes 302 and 304 are servers. Thus, although the servers support Mobile IP and therefore may roam within the network, they may remain stationary and therefore do not necessarily roam to another location within the network. In other words, a server may be stationary, and therefore in such an instance the server does not roam from a first Foreign Agent from which the server has registered to a second Foreign Agent. As shown in this example, each of the Mobile Nodes 302 and 304 remains connected to a different Foreign Agent, Foreign Agent 1 (FA1) 308 and Foreign Agent 2 (FA2) 310, respectively. Although the Mobile Nodes are shown connected to a Foreign Agent, the Mobile Nodes may also register with the Home Agent 306 without accessing a Foreign Agent. More specifically, in Internet Protocol version 4 (Ipv4), the Mobile Nodes may register via a Foreign Agent or a collocated care-of address. Similarly, the Mobile Nodes may register directly (without a Foreign Agent) or indirectly via a Foreign Agent in Internet Protocol version 6 (Ipv6). Thus, the present invention may be implemented in a system in which the Home Agent and the plurality of Mobile Nodes support either Ipv4 or Ipv6.

As shown, each of the Mobile Nodes 302 and 304 sends a registration request to the Home Agent 306. Similarly, the Mobile Nodes 302 and 304 receive a registration reply from the Home Agent 306 in response to the registration request. In this example, the registration request is forwarded to the Home Agent 306 via the corresponding Foreign Agent. In addition, the Foreign Agent receives the registration reply from the Home Agent, which it then forwards to the Mobile Node visiting it.

Once the server Mobile Nodes have registered with the Home Agent 306, the Home Agent and associated dispatcher 312 receive and dispatch server requests to the appropriate server(s). More specifically, a Correspondent Node 314 sends a server request (e.g., HTTP request) to the Home Agent 306. The Home Agent and associated dispatcher together select one of the Mobile Nodes in the server cluster and forward the server request to the selected Mobile Node. For instance, the dispatcher may select one of the plurality of Mobile Nodes using one or more server metrics, such as load balance information (e.g., CPU load, number of opened requests, throughput), proximity to the Correspondent Node, application requested/supported, and client-side information (e.g., QoS group, privileges) These metrics are merely exemplary and therefore other metrics typically used in server selection and known to those of ordinary skill in the art are not mentioned, but may also be used in the server selection process. In addition, the dispatcher may select a server based upon applications supported by the clustered servers. Moreover, the dispatcher may be any conventional dispatcher such as the Cisco CSS 11000 available from Cisco Systems, IBM Network Dispatcher available from IBM, and the Alteon dispatcher available from Nortel Networks.

Figure 4:
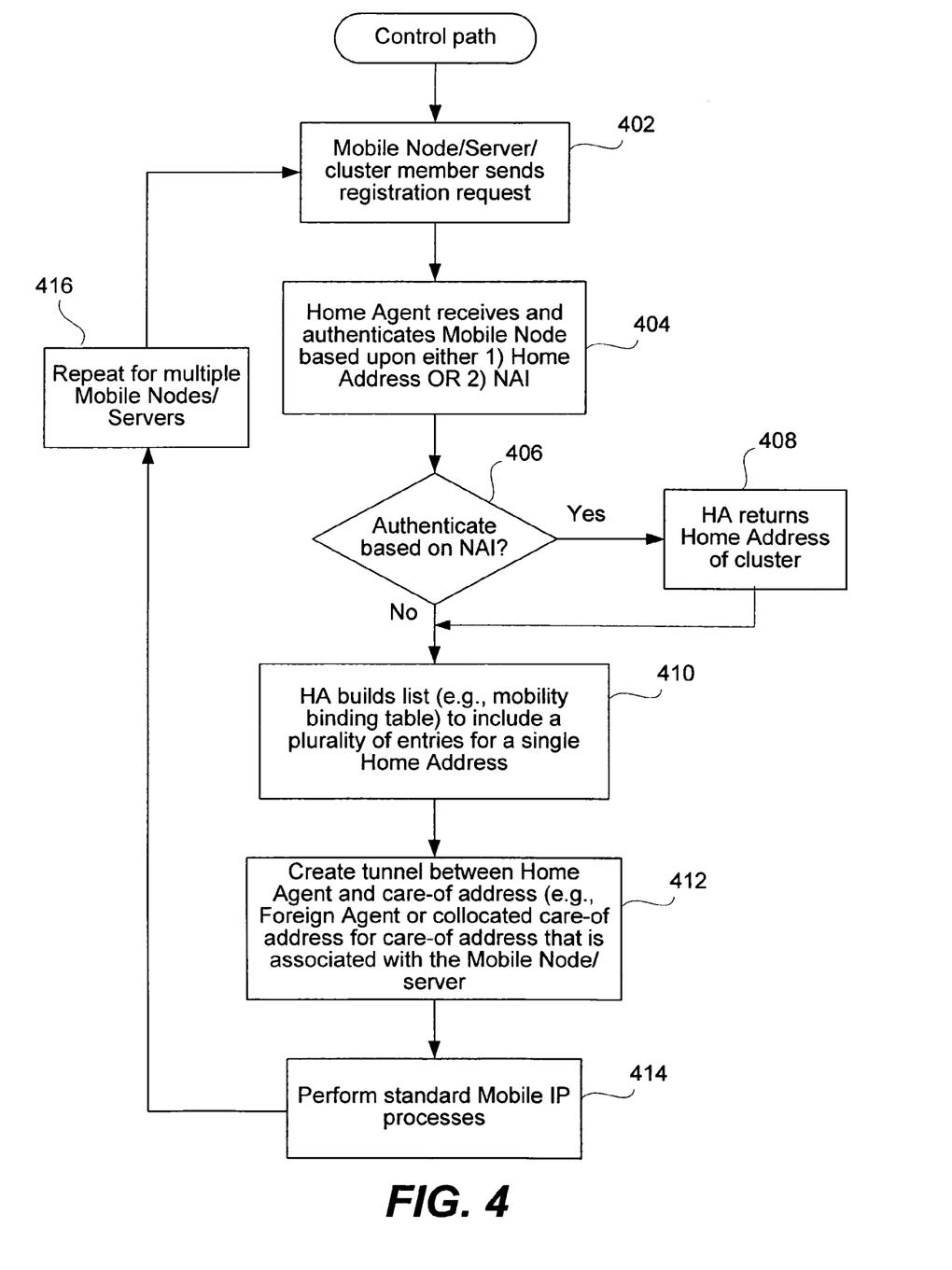
FIG. 4 is a process flow diagram illustrating a method of processing registration requests received from a cluster of Mobile Nodes such that a binding is created between the cluster of Mobile Nodes and the same Home Address in accordance with various embodiments of the invention.

FIG. 4 is a process flow diagram illustrating a method of processing registration requests received from a cluster of Mobile Nodes such that a binding is created between the cluster of Mobile Nodes and the same Home Address in accordance with various embodiments of the invention. A Mobile Node in the server cluster sends a registration request at block 402 to a Home Agent. For instance, the Mobile Node may be statically configured with the Home Agent information (e.g., Home Agent address). The registration request specifies a care-of address, which may be the care-of address of a Foreign Agent or a collocated care-of address. The registration request further includes a Home Address associated with the plurality of Mobile Nodes or a Network Access Identifier (NAI). The Home Agent then authenticates the Mobile Node based upon either the Home Address or the NAI at block 404.

One standardized method for identifying users is proposed in RFC 2486 of the Network Working Group, January 1999, hereby incorporated by reference, which proposes syntax for the NAI, the userID submitted by a client during Point to Point Protocol (PPP) authentication. For instance, the mobile node may be configured with a NAI such as mn1@cisco.com. Thus, when a client is authenticated based upon the NAI, an IP address (i.e., Home Address) may be allocated for use by the client.

The clustered Mobile Nodes are associated with one another. Specifically, in accordance with various embodiments, each of the plurality of Mobile Nodes has the same Home Address. In accordance with a first embodiment, the cluster of Mobile Nodes are statically assigned the same Home Address, which is provided by the each of the Mobile Nodes in the registration request. In accordance with a second embodiment, each of the Mobile Nodes is dynamically assigned the same Home Address. More specifically, a Home Address associated with the cluster of servers is identified or obtained (e.g., using the NAI) and assigned to each of the clustered Mobile Nodes as shown at blocks 406 and 408.

The Home Agent also establishes a binding between the Mobile Node and the associated care-of address at block 410. Specifically, a cluster ID such as a Home Address and care-of address may be stored for the Mobile Node in a Mobility Binding Table. In this manner, a plurality of entries may be stored for a plurality of Mobile Nodes and therefore identified with a single Home Address. An exemplary Mobility Binding Table will be described in further detail below with reference to FIG. 5.

The Home Agent then creates a tunnel at block 412 between the Home Agent and the care-of address for the Mobile Node, thereby enabling a server request to be distributed by the Home Agent to the Mobile Node via the associated tunnel. The Home Agent performs additional standard Mobile IP processes at block 414, and the process is repeated for multiple Mobile Nodes in the server cluster at block 416. In this manner, a Home Agent may receive and process registration requests from a plurality of Mobile Nodes. In other words, the registration of a Mobile Node with the Home Agent is used as a mechanism to control the active subset of members of the cluster upon which the dispatching takes place. Thus, as one example, when a server is taken "off-line" for maintenance, it may de-register with the Home Agent, which removes it from the cluster. Similarly, when the server is put back "on-line," the server registers with the Home Agent again so that it may be included in the cluster, enabling it to receive server requests.

As described above, the Mobile Nodes in a cluster are servers and therefore do not typically roam to another location within the network after sending the registration request to the Home Agent. Thus, in this case, the Home Agent receives a single registration request from each of the plurality of Mobile Nodes. In other words, the Home Agent does not necessarily receive subsequent registration requests from each of the plurality of Mobile Nodes. Moreover, in the embodiment described, each of the plurality of Mobile Nodes registers with the Home Agent via a different care-of address (e.g., different Foreign Agent).

Figure 5:
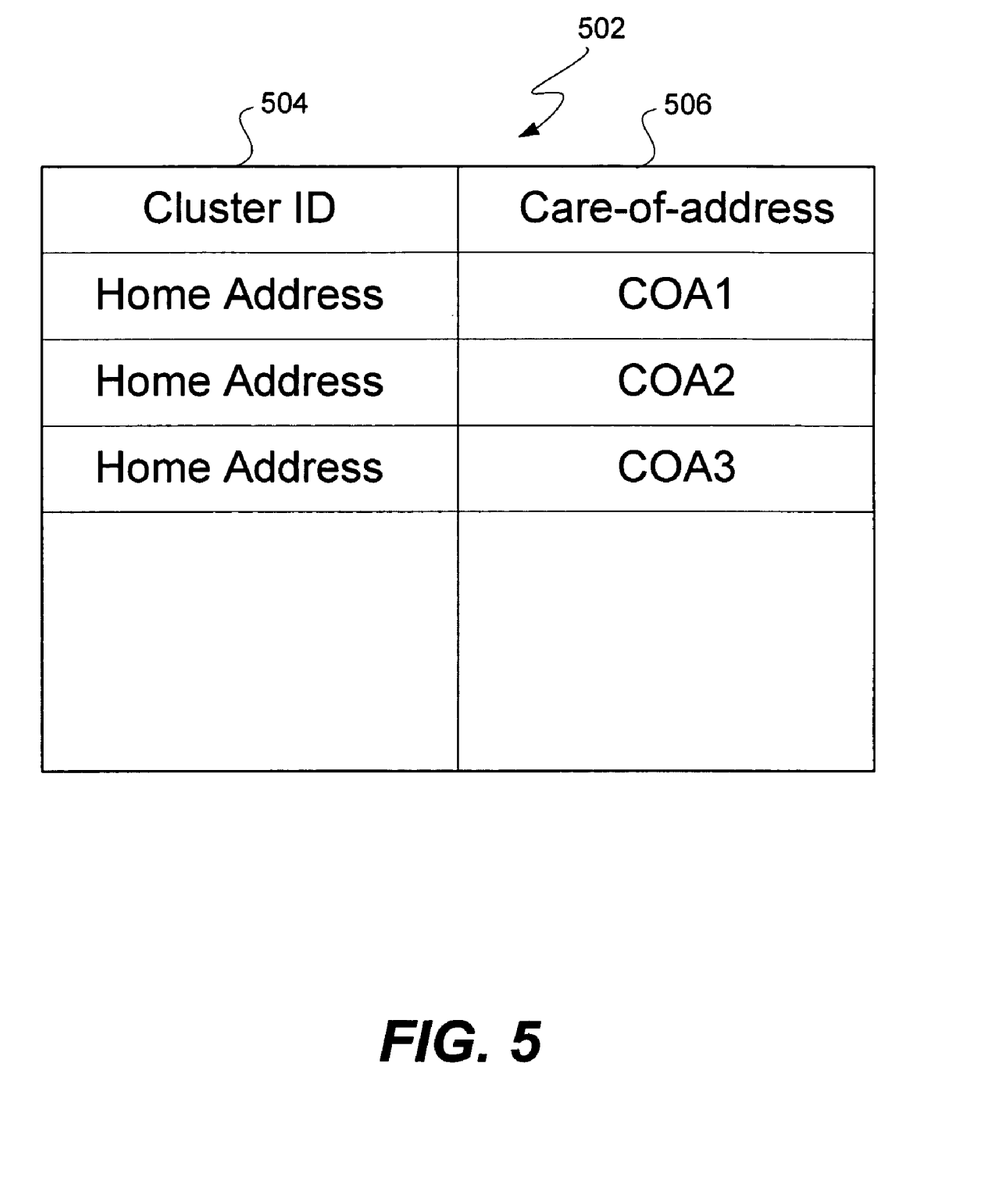
FIG. 5 is a diagram illustrating an exemplary table (e.g., Mobility Binding Table) in which bindings are stored for multiple Mobile Nodes having the same Home Address.

As described above with reference to block 410 of FIG. 4, the Home Agent builds a list such as a Mobility Binding Table that includes a plurality of entries for Mobile Nodes having the same Home Address. FIG. 5 is a diagram illustrating an exemplary table (e.g., Mobility Binding Table) 502 in which bindings are stored for multiple Mobile Nodes having the same Home Address. Specifically, in order to establish a binding between each of the plurality of Mobile Nodes and the associated care-of address, each entry identifies a cluster ID 504 (e.g., Home Address) associated with the plurality of Mobile Nodes. In addition, each entry includes the care-of address 506 associated with the corresponding Mobile Node.

Figure 6:
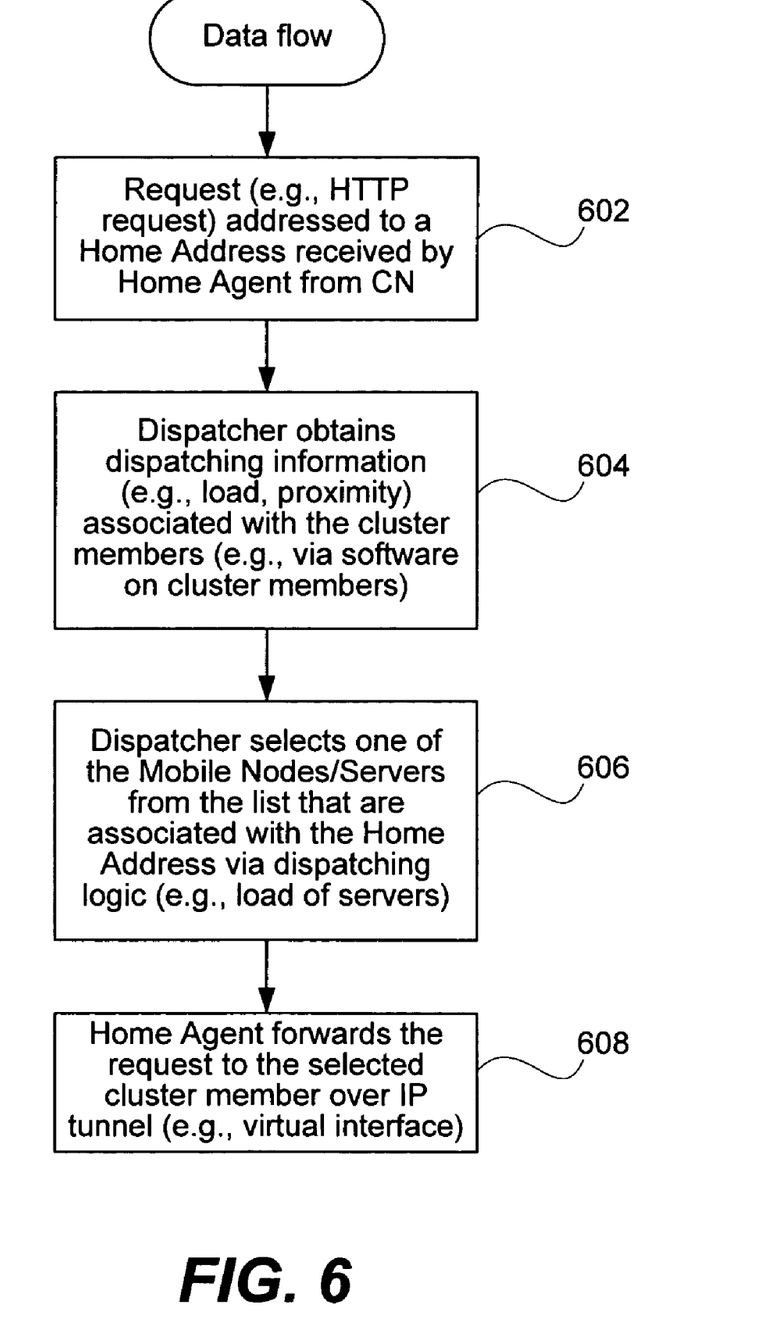
FIG. 6 is a process flow diagram illustrating a method of dispatching a server request to one of the Mobile Nodes in the cluster in accordance with various embodiments of the invention.

After the Mobile Nodes in the server cluster have registered with the Home Agent, server requests may be dispatched to one or more of the Mobile Nodes. FIG. 6 is a process flow diagram illustrating a method of dispatching a server request to one of the Mobile Nodes in the cluster in accordance with various embodiments of the invention. A request (e.g., HTTP) request addressed to a Home Address (associated with the server cluster) is sent by a Correspondent Node and received by the Home Agent at block 602. One of the Mobile Nodes is selected to service the server request prior to forwarding the server request to the selected Mobile Node. More particularly, a dispatcher obtains dispatching information associated with the cluster members at block 604. For instance, the dispatching information may include load information, information indicating proximity of the Mobile Nodes to the Correspondent Node. This information may be obtained by querying the Mobile Nodes or by receiving updates from the Mobile Nodes via software resident on the cluster members. The dispatcher selects one of the Mobile Nodes from the list (e.g., Mobility Binding Table) to service the server request according to one or more metrics such as those listed above (e.g., load, proximity) at block 606. Since the list may include entries associated with one or more server clusters, it may be necessary to ascertain which Mobile Nodes are associated with the Home Address prior to selecting one of the Mobile Nodes. Once the Mobile Node is selected, the server request is forwarded to the selected cluster member. This may be accomplished by forwarding the server request to a care-of address associated with the selected Mobile Node (e.g., obtained from the Mobility Binding Table).

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents, and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 7:
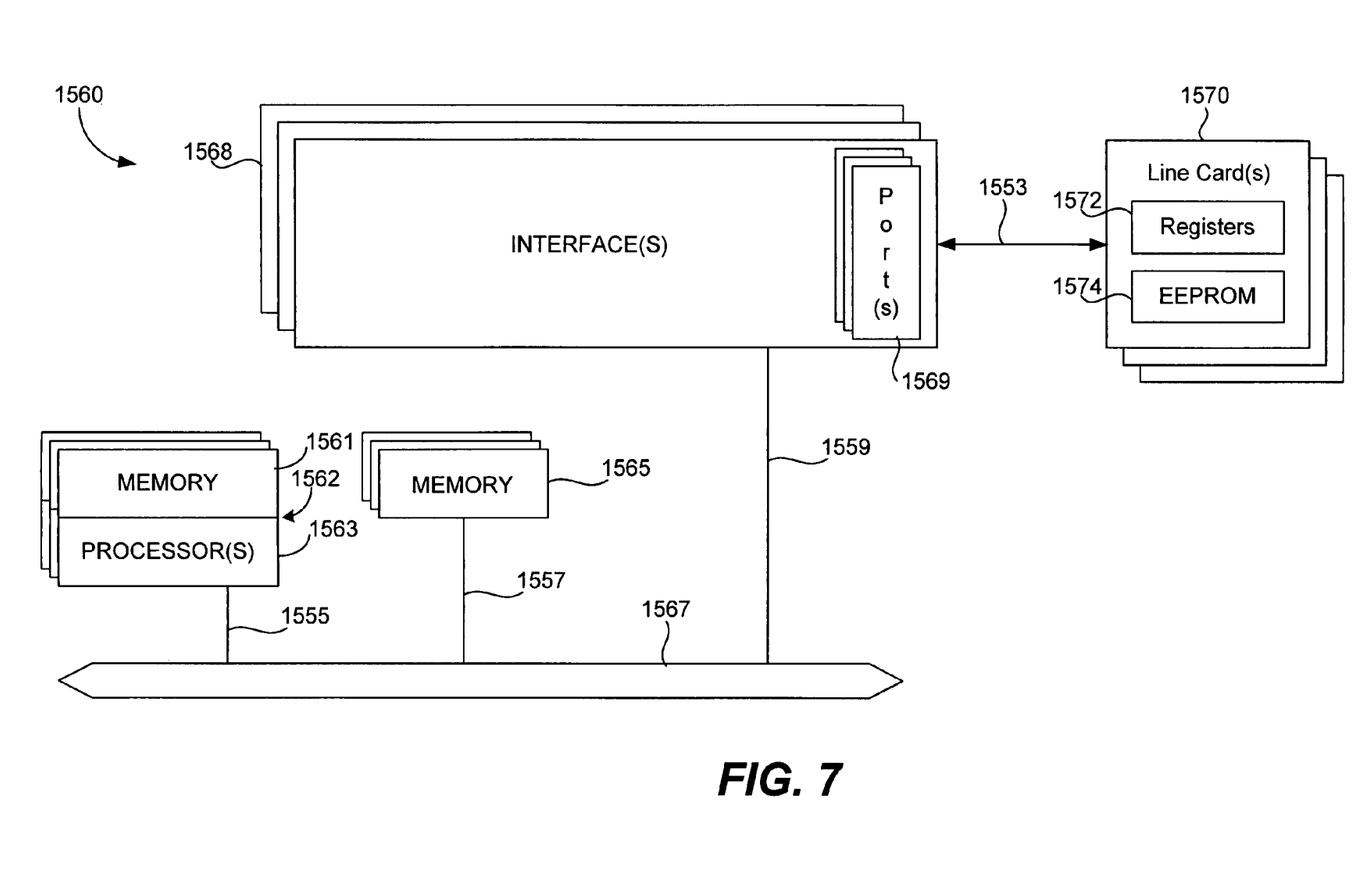
FIG. 7 is a diagram illustrating an exemplary network device in which various embodiments of the invention may be implemented.

Referring now to FIG. 7, a network device 1500 suitable for implementing the techniques of the present invention includes a master central processing unit (CPU) 1505, interfaces 1510, memory 1515 and a bus 1520. When acting under the control of appropriate software or firmware, the CPU 1505 may be responsible for implementing specific functions associated with the functions of a desired network device. For example, when configured as an intermediate router, the CPU 1505 may be responsible for analyzing packets, encapsulating packets, and forwarding packets for transmission to a set-top box. The CPU 1505 preferably accomplishes all these functions under the control of software including an operating system (e.g. Windows NT), and any appropriate applications software.

CPU 1505 may include one or more processors such as those from the Motorola family of microprocessors or the MIPS family of microprocessors. In an alternative embodiment, the processor is specially designed hardware for controlling the operations of network device 1500.

The interfaces 1510 are typically provided as interface cards (sometimes referred to as "line cards"). Generally, they control the sending and receiving of data packets over the network and sometimes support other peripherals used with the network device 1500. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 1505 to efficiently perform routing computations, network diagnostics, security functions, etc.

Although the system shown in FIG. 15 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 1515) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Accordingly, the present embodiments are to be considered as illustrative and not restrictive, and the invention is not to be limited to the details given herein, but may be modified within the scope and equivalents of the appended claims.

What is claimed is:

1. In a Home Agent supporting Mobile IP, a method comprising:
    receiving a registration request from each of a plurality of Mobile Nodes, the registration request specifying a care-of address;
    establishing a binding between each of the plurality of Mobile Nodes and the associated care-of address, each of the plurality of Mobile Nodes being associated with one another as a group of servers among which server requests are to be distributed, wherein each of the plurality of Mobile Nodes is a server and wherein each of the plurality of Mobile Nodes has the same Home Address, thereby associating each of the group of servers with one another, wherein the plurality of Mobile Nodes have the same Home Agent; and
    creating a tunnel between the Home Agent and the care-of address for each of the plurality of Mobile Nodes, thereby enabling a server request to be distributed by the Home Agent to one of the plurality of Mobile Nodes via the associated tunnel.

2. The method as recited in claim 1, wherein each of the servers supports identical server applications or server functions.

3. The method as recited in claim 1, wherein each of the servers provides access to the same web site or web page.

4. The method as recited in claim 1, wherein each of the servers remains connected to a different Foreign Agent.

5. The method as recited in claim 1, wherein the Home Agent receives a single registration request from each of the plurality of Mobile Nodes.

6. The method as recited in claim 1, wherein each of the plurality of Mobile Nodes has registered with the Home Agent from a different Foreign Agent.

7. The method as recited in claim 1, wherein the Home Agent assigns the Home Address associated with a cluster of servers including the plurality of Mobile Nodes to each of the plurality of Mobile Nodes, thereby enabling a Correspondent Node to send a server request to the cluster of servers at the Home Address assigned to each of the plurality of Mobile Nodes in the cluster of servers.

8. The method as recited in claim 7, wherein the registration request includes a NAI, the method further comprising:
    obtaining the Home Address associated with the NAI.

9. The method as recited in claim 1, wherein the registration request received from each of the plurality of Mobile Nodes includes the same Home Address.

10. The method as recited in claim 1, wherein establishing a binding between each of the plurality of Mobile Nodes and the care-of address comprises:
    storing a plurality of entries in a Mobility Binding Table, each of the plurality of entries identifying a cluster ID associated with the plurality of Mobile Nodes, the cluster ID indicating that the plurality of Mobile Nodes are servers in the group of servers.

11. The method as recited in claim 10, wherein the cluster ID is a single Home Address assigned to the plurality of Mobile Nodes.

12. The method as recited in claim 11, wherein each of the plurality of entries includes the care-of address associated with the corresponding Mobile Node.

13. The method as recited in claim 1, wherein the care-of address is a collocated care-of address or a Foreign Agent care-of address.

14. The method as recited in claim 1, wherein the Home Agent and the plurality of Mobile Nodes support Ipv4.

15. The method as recited in claim 1, wherein the Home Agent and the plurality of Mobile Nodes support Ipv6.

16. The method as recited in claim 1, further comprising:
    receiving a server request from a Correspondent Node, the server request being addressed to the Home Address associated with the plurality of Mobile Nodes; and
    forwarding the server request to one of the plurality of Mobile Nodes.

17. The method as recited in claim 16, further comprising:
    selecting one of the plurality of Mobile Nodes to service the server request.

18. The method as recited in claim 17, wherein selecting one of the plurality of Mobile Nodes comprises:
    selecting one of the Mobile Nodes according to one or more metrics including at least one of load information and proximity of the Mobile Nodes to the Correspondent Node.

19. The method as recited in claim 17, wherein selecting one of the plurality of Mobile Nodes to service the server request comprises:
    ascertaining the plurality of Mobile Nodes associated with the Home Address prior to selecting one of the plurality of Mobile Nodes.

20. The method as recited in claim 17, wherein forwarding the server request to one of the plurality of Mobile Nodes comprises:
    forwarding the server request to a care-of address associated with the selected Mobile Node.

21. The method as recited in claim 1, wherein the plurality of Mobile Nodes share a single address.

22. The method as recited in claim 21, wherein the single address is a home address.

23. The method as recited in claim 1, wherein the registration request received from each of the plurality of Mobile Nodes further includes a Home Address that has been assigned to the plurality of Mobile Nodes such that the same Home Address is assigned to each of the plurality of Mobile Nodes, wherein establishing a binding includes associating the Home Address with the care-of address of each of the plurality of Mobile Nodes.

24. The method as recited in claim 1, wherein the registration request received from each of the plurality of Mobile Nodes further includes a NAI that enables a single Home Address to be dynamically assigned to the plurality of Mobile Nodes such that the same Home Address is assigned to each of the plurality of Mobile Nodes.

25. The method as recited in claim 1, wherein a single Home Address is statically or dynamically assigned to each of the plurality of Mobile Nodes such that the same Home Address is assigned to each of the plurality of Mobile Nodes.

26. The method as recited in claim 1, wherein establishing a binding between each of the plurality of Mobile Nodes and the associated care-of address comprises:
    establishing a binding between a cluster identifier associated with the plurality of Mobile Nodes and the care-of address associated with each of the plurality of Mobile Nodes.

27. The method as recited in claim 1, wherein the cluster identifier is a Home Address assigned to the plurality of Mobile Nodes such that the same Home Address is assigned to each of the plurality of Mobile Nodes.

28. In a Home Agent supporting Mobile IP, a method comprising:
    receiving a registration request from each of a plurality of Mobile Nodes, the registration request specifying a care-of address;

establishing a binding between each of the plurality of Mobile Nodes and the associated care-of address, each of the plurality of Mobile Nodes being associated with one another; and creating a tunnel between the Home Agent and the care-of address for each of the plurality of Mobile Nodes, thereby enabling a server request to be distributed by the Home Agent to one of the plurality of Mobile Nodes via the associated tunnel, wherein each of the plurality of Mobile Nodes is a server and wherein each of the plurality of Mobile Nodes has the same Home Address, thereby associating each of the group of servers with one another, wherein the plurality of Mobile Nodes have the same Home Agent;

wherein each of the plurality of Mobile Nodes are servers;

wherein each of the servers does not roam to another location within the network after sending the registration request to the Home Agent.

29. The method as recited in claim 28, wherein each of the servers does not roam from a first Foreign Agent from which the server has registered to a second Foreign Agent.

30. The method as recited in claim 7, wherein the Home Agent does not receive subsequent registration requests from each of the plurality of Mobile Nodes.

31. The method as recited in claim 28, each of the plurality of Mobile Nodes being associated with one another such that a cluster identifier is associated with the plurality of Mobile Nodes.

32. The method as recited in claim 31, wherein the cluster identifier is a Home Address assigned to the plurality of Mobile Nodes such that the same Home Address is assigned to each of the plurality of Mobile Nodes, wherein establishing a binding between each of the plurality of Mobile Nodes and the associated care-of address comprises:

establishing a binding the Home Address associated with the plurality of Mobile Nodes and the care-of address associated with each of the plurality of Mobile Nodes.

33. A Home Agent supporting Mobile IP, comprising:

means for receiving a registration request from each of a plurality of Mobile Nodes, the registration request specifying a care-of address;

means for establishing a binding between each of the plurality of Mobile Nodes and the associated care-of address, each of the plurality of Mobile Nodes being associated with one another as a group of servers among which server requests are to be distributed, wherein each of the plurality of Mobile Nodes is a server and wherein each of the plurality of Mobile Nodes has the same Home Address, thereby associating each of the group of servers with one another; and means for creating a tunnel between the Home Agent and the care-of address for each of the plurality of Mobile Nodes, thereby enabling a server request to be distributed by the Home Agent to one of the plurality of Mobile Nodes via the associated tunnel.

34. A computer-readable medium storing thereon computer-readable instructions, comprising:

instructions for receiving a registration request from each of a plurality of Mobile Nodes, the registration request specifying a care-of address;

instructions for establishing a binding between each of the plurality of Mobile Nodes and the associated care-of address, each of the plurality of Mobile Nodes being associated with one another as a group of servers among which server requests are to be distributed, wherein each of the plurality of Mobile Nodes is a server and wherein each of the plurality of Mobile Nodes has the same Home Address, thereby associating each of the group of servers with one another, wherein the plurality of Mobile Nodes have the same Home Agent; and instructions for creating a tunnel between a Home Agent and the care-of address for each of the plurality of Mobile Nodes, thereby enabling a server request to be distributed by the Home Agent to one of the plurality of Mobile Nodes via the associated tunnel.

35. A Home Agent supporting Mobile IP, comprising:

a processor; and a memory, at least one of the processor and the memory being adapted for:

receiving a registration request from each of a plurality of Mobile Nodes, the registration request specifying a care-of address;

establishing a binding between each of the plurality of Mobile Nodes and the associated care-of address, each of the plurality of Mobile Nodes being associated with one another as a group of servers among which server requests are to be distributed, wherein each of the plurality of Mobile Nodes is a server and wherein each of the plurality of Mobile Nodes has the same Home Address, thereby associating each of the group of servers with one another, wherein the plurality of Mobile Nodes have the same Home Agent; and creating a tunnel between the Home Agent and the care-of address for each of the plurality of Mobile Nodes, thereby enabling a server request to be distributed by the Home Agent to one of the plurality of Mobile Nodes via the associated tunnel.

36. A server request dispatching system, comprising:

a network device supporting Mobile IP adapted for establishing a binding between a plurality of Mobile Nodes and associated care-of address, the plurality of Mobile Nodes being associated with one another as a group of servers having the same Home Address among which server requests are to be distributed, wherein each of the plurality of Mobile Nodes is a server and wherein each of the plurality of Mobile Nodes has the same Home Agent; and a request dispatching mechanism adapted for receiving a server request from a Correspondent Node and forwarding the server request to one of the plurality of Mobile Nodes, the server request being addressed to the Home Address associated with the plurality of Mobile Nodes, wherein the network device is a Home Agent and wherein the Home Agent includes the request dispatching mechanism.

37. The server request dispatching system as recited in claim 36, wherein the network device being further adapted for creating a tunnel between the Home Agent and the care-of address for each of the plurality of Mobile Nodes, thereby enabling a server request to be distributed by the Home Agent to one of the plurality of Mobile Nodes via the associated tunnel.

38. The server request dispatching system as recited in claim 36, further comprising:

a dispatcher coupled to the network device, the dispatcher being adapted for selecting one of the plurality of Mobile Nodes to service the server request.

39. The server request dispatching system as recited in claim 38, wherein the network device is a Home Agent including the dispatcher.

40. The server request dispatching system as recited in claim 39, wherein the network device further includes the request dispatching mechanism.

41. A server request dispatching system, comprising:
- a network device supporting Mobile IP adapted for establishing a binding between a plurality of Mobile Nodes and associated care-of address, the plurality of Mobile Nodes having the same Home Address, wherein the network device is a Home Agent;
- a request dispatching mechanism adapted for receiving a server request from a Correspondent Node and forwarding the server request to one of the plurality of Mobile Nodes, the server request being addressed to the Home Address associated with the plurality of Mobile Nodes, wherein each of the plurality of Mobile Nodes is a server and wherein each of the plurality of Mobile Nodes has the same Home Address, thereby associating each of the group of servers with one another, wherein the plurality of Mobile Nodes have the same Home Agent; and
- a dispatcher coupled to the network device, the dispatcher being adapted for selecting one of the plurality of Mobile Nodes to service the server request;

wherein the dispatcher is separate from the network device.

* * * * *